Aug. 25, 1925.
S. APOSTOLOFF
ELECTRIC BATTERY ELEMENT
Filed May 21. 1918
1,551,359
Fig. 1.
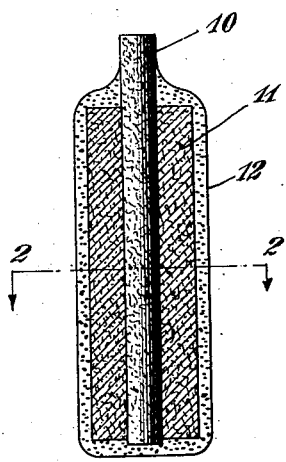
Fig. 3.
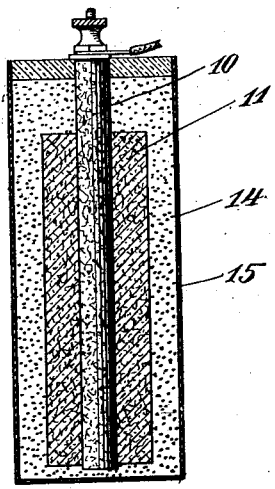
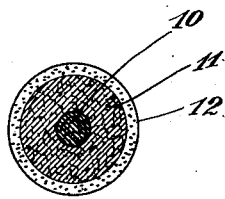
Fig. 2.
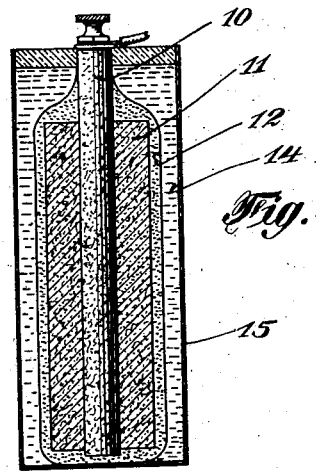
Fig. 4.
Inventor
Serge Apostoloff
By his Attorney Patented Aug. 25, 1925.

1,551,359

UNITED STATES PATENT OFFICE.

SERGE APOSTOLOFF, OF NEW YORK, N. Y.

ELECTRIC-BATTERY ELEMENT.

Application filed May 21, 1918. Serial No. 235,883.

*To all whom it may concern:*

Be it known that I, SERGE APOSTOLOFF, a subject of the King of Great Britain and Ireland, residing at New York, in the county and State of New York, have invented a certain new and useful Improvement in Electric-Battery Elements, of which the following is a specification.

This invention relates to electric battery elements, and more particularly to an improved separator and electrolyte container for such batteries; and while directed especially to primary batteries of the type known as dry cells, wherein the electrolyte is either retained in such a manner, or is itself in such a condition, that it will not flow from the cells when the latter are tipped or inverted, it is to be understood that many of the features of my invention are applicable to batteries of other types such, for example, as storage batteries; also that my said separator will bind and isolate the active mass of the depolarizer, and prevent disintegration thereof, while it will facilitate the ionization of the current between the electrodes.

The principal object of my invention is to provide, for batteries of such character, an improved means and method for protecting the depolarizer against disintegration.

Another object of my invention is to simplify the manufacture of the present so-called flash light dry batteries, which are all, without exception so far as I am aware, using a wrapper of cotton cloth, which is tied around the depolarizer for insulating purposes, a procedure very slow in production, costly in labor, and very clumsy from a manufacturing point of view.

Practically all of the well known forms of dry batteries employ zinc and carbon for the positive and negative electrodes respectively; manganese dioxide or a similar substance as the depolarizing agent; and a neutral or nearly neutral solution as the electrolyte. The carbon is usually pressed into the depolarizing mass forming a small cylinder which, when sufficiently hardened, after exposure to ordinary air for about three days, is enclosed in a cotton wrapper and inserted into the zinc electrode which is usually in the form of a cylindrical tube firmly closed at the bottom.

The electrolyte used in cells of this type usually consists of a sticky or pasty mass, commonly called the "battery mix," and is formed either by mixing a solution of the electrolyte with a suitable dry substance, such as flour, starch, gelatine, fruit extracts, isinglass, etc., or by pouring liquid on a dry substance containing the electrolyte material. The zinc tube is filled with a charge of the electrolyte and is sealed on the top by sealing wax or pitch, and the cell is then ready for use.

In constructing a battery cell according to my invention the carbon and depolarizing mass may be brought together in the usual manner, my invention consisting, briefly, in providing a new and improved binder which takes the place of the cotton wrapper.

To produce this binder I take material which is of an extremely spongy or porous nature, such as pumice stone, kieselguhr, or other infusorial earths, possessing the capacity to absorb liquids, whether jellified by any of the above mentioned mixtures of organic matters with the requisite electrolyte or not.

I first compose a creamy mixture consisting of say kieselguhr and either pure water or the electrolytic fluid, still in the state of a thin liquid containing the desired salts, such for instance as sal-ammoniac and zinc chloride with or without 1 per cent of starch.

Where hardening of this creamy mass is desired I add from 5 to 10 per cent of a binder such as alum, Portland cement, magnesia, or ordinary silica.

Premature setting of this mixture during operation may be retarded either by keeping the mixture warmed to a tepid temperature, or by adding thereto from 1 to 10 per cent of an acetic solution.

This mixture may either be applied as a coating to the depolarizing material either by painting it on the same with a brush, or by dipping the depolarizing material into the mixture or the mixture may be mixed directly with the electrolyte and the coating operation dispensed with.

When applied as a coating to the depolarizer the consistency of the mixture may be regulated so that from the time of brushing or dipping up to the time of depositing the carbon and depolarizer in the zinc tube the mixture will have set or dried sufficiently to preserve its coating intact. I can however hasten the setting or drying by dipping or painting it again with a solution of bi-sulphate of iron with from 1 to 2 per cent of sulphuric acid 66 Beaumé added thereto which may be washed off subsequently.

The above method is especially applicable where the manufacturer desires to preserve his present type of electrolytic mass, and employ my invention instead of using the cotton wrapping and tying method above described.

My invention is applicable with marked advantage if it is used by employing the spongy mixture as a complete container of the electrolyte, the spongy mass then serving as a filter and ionizing screen between the depolarizer and the inner wall of the zinc tube. In this case no brushing or dipping is required.

In employing my invention in this manner the creamy mixture of kieselguhr and the electrolyte is made of desired consistency, and the zinc tube is filled up with it to a predetermined level so that when the carbon and depolarizer is inserted therein the mass will attain the level usually fixed for sealing purposes, when the wax or pitch may be added, and the cell is ready for use. This method of manufacture dispenses with the wrapping process now in use, and also the necessity for insulating the bottom of the zinc tube by placing a card board washer therein.

In the drawings, which form a part of this specification, and in which similar letters and figures of reference refer to corresponding parts wherever they occur:

Figure 1 is a longitudinal sectional view of a carbon bobbin with depolarizing material with my spongy covering applied thereto;

Figure 2 is a transverse sectional view of the same;

Figure 3 is a central longitudinal sectional view of a battery cell constructed according to my invention where the carbon bobbin is inserted directly into the spongy mass containing the electrolyte; and, Figure 4 is a similar view to the last, showing a bobbin covered according to my invention inserted into the battery cell in the usual manner.

10 indicates the carbon electrode, and 11 the depolarizing material, which is brought together with the carbon in the usual manner, 12 indicating my spongy covering, which has been applied to the outside of the depolarizing material by brushing or dipping, as above described.

Figure 4 shows the complete construction of a battery cell according to my invention, 15 being the zinc container.

Referring to Figure 3, 14 represents the electrolyte, which in this case consists of my spongy mass, as above described, which also contains the electrolyte, and in which the carbon bobbin is embedded without the necessity of first covering it.

It should be understood that my invention is not limited to the embodiments and features specifically shown and described herein, but that such embodiments and features are subject to many changes and modifications without departing from the spirit of my invention.

What I claim as new and desire to secure by Letters Patent is:—

1. In a battery cell the combination with a bobbin, of an electrolyte containing a silicious material of a spongy or porous nature, and a binder.

2. In a battery cell the combination with the bobbin, of a depolarizing material, an electrolyte containing a silicious, spongy or porous material, and a binder.

3. In a battery cell the combination with a bobbin, of an electrolyte containing a silicious, spongy or porous material.

In testimony whereof, I have signed my name to this specification this 7th day of May 1918.

SERGE APOSTOLOFF.